United States Patent

[11] 3,572,038

[72] Inventor Samuel E. Arnett
 South Bend, Ind.
[21] Appl. No. 748,416
[22] Filed July 29, 1968
[45] Patented Mar. 23, 1971
[73] Assignee The Bendix Corporation

[54] THRUST CONTROL MECHANISM
 7 Claims, 4 Drawing Figs.
[52] U.S. Cl. .................................................. 60/243,
 60/39.28
[51] Int. Cl. ..................................................... F02k 3/00,
 F02c 9/08
[50] Field of Search .................................................. 60/237,
 235, 243, 39.28

[56] References Cited
 UNITED STATES PATENTS
2,683,349 7/1954 Lawrence...................... 60/243

Primary Examiner—Al Lawrence Smith
Attorney—Plante, Arens, Hartz and O'Brien

ABSTRACT: A thrust control mechanism for use in association with a combustion engine having a valve means to control the flow of fuel to said combustion engine upon command, which is responsive to a pressure responsive member for sensing thrust as a function of the pressure drop across said combustion engine exhaust nozzle. Said thrust control mechanism may further include an absolute reference means to compensate for changes in ambient pressure of the device and a variable nozzle area input means to compensate for changes in combustion engine thrust due to different settings of nozzle area.

INVENTOR.
SAMUEL E. ARNETT

INVENTOR.
SAMUEL E. ARNETT

3,572,038

THRUST CONTROL MECHANISM

Background of the Invention

This invention relates, in general, to combustion engine fuel controls and, in particular, a thrust control mechanism to override upon command a conventional fuel control concept for a gas turbine engine.

The conventional gas turbine engine fuel control systems with which I am familiar employ concepts and structure that maintain engine speed at a selected value. Thus, for example, as a vertical takeoff and landing aircraft approaches a landing surface, hot exhaust gases are deflected off the landing surface and recirculate to the gas turbine engine inlet. This increases the inlet temperature and engine speed starts to increase beyond the selected value. To decrease speed, the fuel flow to the engine is then automatically reduced with a resulting decrease in thrust. This sequence of events could result in a serious aircraft attitude problem and an unstable uncontrolled landing. Further, some aircraft experience during supersonic flight, a power setting of engine speed or afterburner fuel-to-air ratio which result in an unstable intersection of thrust and drag. Still further, specific selection of speeds on a multiengine aircraft does not generally result in optimized individual engine performance in terms of fuel consumption.

Summary of the Invention

It is the purpose of this invention to provide a thrust control mechanism whereby engine performance may be controlled as a function of thrust measured across said gas turbine engine exhaust nozzle. With regard to vertical takeoff and landing, if thrust in lieu of engine speed were being controlled, the engine control would change only enough to compensate for changes in specific fuel consumption. That is to say, since thrust is equal to the fuel flow divided by specific fuel consumption, the only change that it is required is to compensate for the change in specifics. This change is small in magnitude and occurs smoothly resulting in improved landing control.

It is another object of this invention such that at the unstable intersection of thrust and drag that can exist in supersonic flight, thrust control of the gas turbine engine may be selected and, automatically, a stable thrust-drag intersection would result.

It is another object of this invention to provide individual thrust control of the various engines so that the thrust may be varied along with aircraft trim to obtain optimum gas turbine engine fuel consumption.

Other objects and features of the invention will be apparent from the following description of the thrust control mechanism taken in connection with the accompanying drawings.

Description of the Preferred Embodiment

Figure 1:
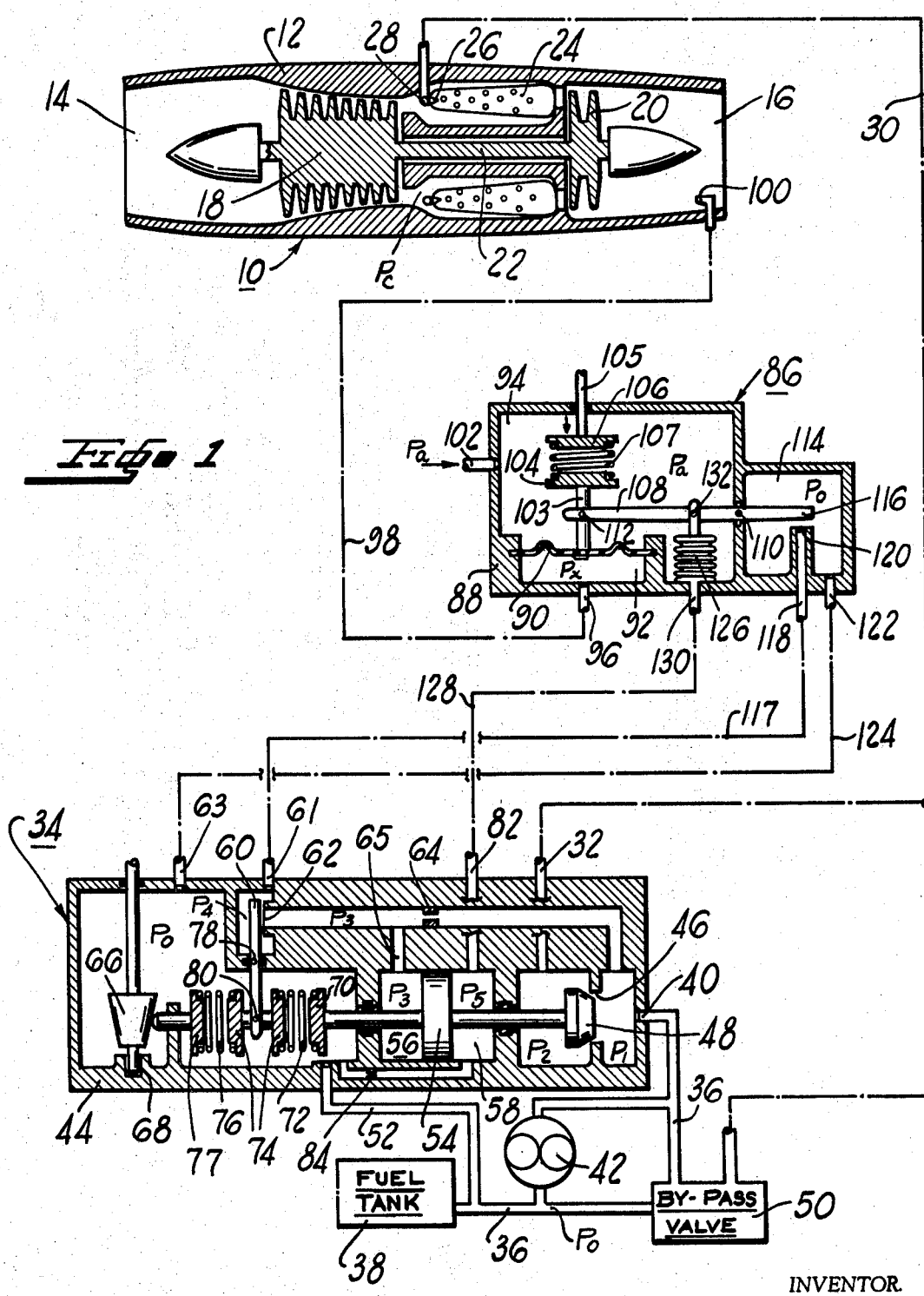
FIG. 1 is a sectional schematic of the components comprising the thrust control mechanism shown in association with a gas turbine engine and its conventional fuel control.

Referring now to the drawings and particularly to FIG. 1, numeral 10 designates a gas turbine engine having a casing 12 with an air inlet 14 and an outlet or exhaust nozzle 16. Air from the inlet 14 flows through a compressor 18 driven by a turbine or turbines 20 via a shaft 22 suitable mounted for rotation in casing 12. The pressurized air at pressure $P_c$ discharged from compressor 18 flows to combustion chambers 24 where pressurized fuel injected by fuel nozzles 26 is mixed with the air and burned to provide a flow of hot motive gas. The hot motive gas flows through turbine 20 driving the same and exhausts therefrom to the nozzle 16 from which the gas exits to the atmosphere to provide propelling thrust.

The fuel nozzles 26 are connected to a fuel manifold 28 which receives a pressurized metered flow of fuel via a fuel conduit 30 leading from the outlet 32 of a fuel control 34. A supply fuel conduit 36 connects a fuel tank 38 with inlet 40 of fuel control 34. An engine driven fuel pump 42 connected to conduit 36 serves to pressurize the fuel passing to inlet 40.

The fuel control 34 is provided with a casing 44 having inlet and outlet ports, 40 and 32, respectively, formed therein. Fuel flow from the inlet 40 to the outlet 32 is controlled by a valve means comprising a variable area metering orifice 46 and a metering or control valve 48 which cooperates with the orifice 46 to establish an effective flow area, and thus, rate of fuel flow to the combustion chamber 24. A constant predetermined fuel pressure drop $P_1-P_2$, across orifice 46, is maintained by a conventional bypass valve mechanism generally indicated by 50 which is responsive to the pressure drop $P_1-P_2$ across orifice 46 and which functions to divert more or less fuel at pressure $P_1$ depending upon the relative pressure drop error across orifice 46 from the upstream side of orifice 46 back to the inlet of fuel pump 42 at relatively low pressure $P_o$ to thereby cause a decrease or increase in the pressure as required to maintain the constant predetermined drop $P_1-P_2$. A drain passage 52 vents the interior of casing 44 to passage 36 at fuel pump inlet pressure $P_o$.

The metering valve 48 is operatively connected to and actuated by a servo piston 54 slidably carried in casing 44 and separating chambers 56 and 58 which are pressurized by fuel controlled by a servo flapper valve 60 in cooperation with orifice 62 which receives fuel pressure $P_3$ through a restriction 64 from fuel pressure $P_1$. Chamber 56 receives said fuel pressure $P_3$ through passage 65 as a function of the position of flapper valve 60 relative to orifice 62. The servo piston 54 is operatively connected to a fuel scheduling cam 66, suitable guided on one end by the casing 44 and slidably retained in a cavity 68 of the casing 44 on its other end, by means of a spring retainer 70 operatively attached to said servo piston 54, a spring 72, a double-ended spring retainer 74, a spring 76 and a spring retainer 77 slidingly retained by casing 44. Servo flapper valve 60 is pivotally retained by casing 44 via pin 78 and pivotally attached intermediate said double-ended spring retainer by pin 80. The fuel scheduling cam 66 may be operatively connected to reflect numerous parameters as variable functions of engine performance or pilot initiated commands to the engine. The spring 76 serves to convert the position setting of the fuel scheduling cam 66 into a force acting upon the servoflapper valve 60 and the spring 72 reacts against its retainer 70, being opposed to movement by fuel pressure $P_1$, to provide a force-opposing feedback which nulls the force transmitted to the servo flapper valve 60 by the spring 76. The servoflapper valve 60 is responsive to the fuel scheduling cam 66 so as to control the effective area of orifice 62 and thus regulate the servo pressure $P_3$ in chamber 56 to position servo piston 54.

The servoflapper valve 60 in cooperation with orifice 62 derive a downstream pressure $P_4$ that may be made available at an outlet 61 to facilitate further control of the fuel control 34 by a complementing engine control system. Further, an inlet 63 is provided in the casing 44 to vent returning fuel from the complementing engine control system to pressure $P_o$. As may be seen by those skilled in the art, the fuel control 34 and the complementing engine control may be combined into a single structure should it be desirable for a specific application. If a complementing engine control is not used, the outlet 61 may merely be vented to pressure $P_o$ through inlet 63 to make an operable system. Chamber 58 has a pressure $P_5$ that will vary in proportion to the rate of change of the position of the servopiston 54. Pressure $P_5$ may be made available at outlet 82 to provide a lead function to a complementing engine control system. Pressure $P_5$ is vented through a restriction 84 to fuel pressure $P^-$. Thus, during any period when the servo piston 54 is not changing position, pressure $P_5$ will equal $P_o$ and a lead function signal will not be reflected by pressure $P_5$ at outlet 82. If a complementing engine control system is not used the outlet 82 may merely be closed off to prevent fuel leakage to the outside ambient.

A thrust control mechanism 86 complements the fuel control 34 for control of the gas turbine engine 10. The thrust control mechanism 86, as shown in FIG. 1, has a casing 88 wherein a diaphragm 90 defines chambers 92 and 94. Chamber 92 receives total nozzle pressure $P_x$ through inlet 96, passage 98 and pressure sensing element 100, immediately upstream from the gas turbine exhaust nozzle 16. The diaphragm 90 is responsive on one side to variations in nozzle pressure $P_x$. Diaphragm 90 is responsive to its other side to ambient air pressure $P_a$ entering chamber 94 through inlet 102 and has rigidly attached thereto a shaft 103 and a spring retainer 104. A second shaft 105 and spring retainer 106 are slidingly retained by casing 88. A spring 107 is retained between the spring retainers 104 and 106 and therewith comprises a thrust request means which translates thrust position information into a force to act upon a valve or lever means 108. The diaphragm 90 is responsive to the thrust of the gas turbine engine 10 and acts in a force-opposing relationship with the thrust request means to null any requested increase or decrease in thrust. The lever means 108 is pivotally attached to the casing 88 by pin 110 and has its one end pivotally attached to the shaft 103 by pin 112 while its other end extends into chamber 114 and defines a valve 116. Chamber 114 receives fuel pressure $P_4$ from outlet 61 through passage 117, inlet 118 and an orifice 120 and vents through outlet 122, passage 124 and inlet 63 to fuel pressure $P_o$. A bellows 126, responsive through passage 128 and inlet 130 to servo piston rate of change pressure $P_5$, is rigidly fixed on one end to casing 88 and pivotally attached by pin 132 to lever means 108. The bellows 126 relates to the lever means 108, an anticipatory force as a function of the rate of change of the servo piston 54 and the corresponding fuel flow to the gas turbine engine 10 to damp the response of the lever means 108 to the request for thrust means. Upon a request for thrust the valve 116 in cooperation with orifice 120 controls the pressure $P_4$ and can thereby override the normal control of the fuel control 34 by the fuel scheduling cam 66 to decrease the fuel flow rate established by fuel scheduling cam 66. It is noted that the thrust control mechanism 86 may never override the fuel scheduling cam 66 to increase the fuel flow rate established by the fuel scheduling cam 66. When the thrust control mechanism 86 overrides the otherwise normal functioning of the fuel control 34, fuel flow to the gas turbine engine 10 will vary directly as a function of a specific request for thrust. It is noted that the shaft 105, responsive to a request for thrust, may be operatively attached to a manual control system available to the operator of the gas turbine engine 10 or preprogrammable by structure similar to fuel scheduling a cam 66 or equivalent.

As can be seen by those skilled in the art the fuel control 34 and thrust control mechanism 86 casings can be made of two or more parts to enable assembly of the various components therein. Although not previously mentioned, those skilled in the art will further see that seals may be employed in the appropriate placed to preclude fuel leakage.

Mode of Operation of the Preferred Embodiment

Initially, it will be assumed that the gas turbine engine 10 is stable in operation with the fuel scheduling cam 66 set to provide a near maximum fuel flow. Thus, the flapper valve 60 is open relative to orifice 62. Further, it is assumed that a reasonably low value of thrust has been selected, and thus, the flapper valve 116 is only partially opened with respect to orifice 120. The system as a whole is in a null condition.

The shaft 105 is moved in the direction of the arrow shown in FIG. 1, to request increased thrust from the gas turbine engine 10. Spring 107 will compress and convert a position input from shaft 105 and spring retainer 106 into a force, causing spring retainer 104 and shaft 103 to act against the diaphragm 90 and nozzle pressure $P_x$ such that lever means 108 is pivoted about pin 110 to further open valve 116 relative to orifice 120. Thus, pressures $P_4$ and $P_3$ drop, since valve 60 is open with respect to orifice 62. The drop in pressure $P_3$ allows servopiston 54 to move to the left in response to pressure $P_1$ acting against valve 48. As servopiston 54 and valve 48 move to the left, increased fuel flow is provided to the gas turbine engine which upon combustion results in increased thrust venting through exhaust nozzle 16. The increase in thrust has a finite response time which is a function of the flow rates of the system, and thus, increased thrust is not instantaneously available upon a request for increased thrust. The increasing thrust will be sensed by element 100 and communicated through passage 98 and inlet 96 to chamber 92 to act upon discharge diaphragm 90 in opposition to the request for increased thrust. The increased nozzle pressure $P_x$ will, acting alone on diaphragm 90, eventually null the thrust control mechanism 86 and thus the fuel control 34. However, as servopiston 54 moves to the left in response to a request for increased thrust, spring retainer 70 compresses spring 72 so as to exert a first force on flapper valve 60 to further close it relative to orifice 62. This first force is opposed by a second force resulting from spring retainer 74 tending to compress spring 76 against spring retainer 77. The second force tends to damp the first force with respect to further closing flapper valve 60 and bringing the system to a null. To further refine the responsiveness of the system, a thrust request lead signal may be provided to anticipate the conditions necessary for a null as soon as possible after a thrust request has been made. The fuel control 34 derives such a lead signal at outlet 82 as servopiston 54 moves to the left in response to a request for increased thrust. The existing pressure $P_5$ in chamber 58 will be equal to pressure $P_o$; however, as piston 54 moves to the left the volume of chamber 58 will increase and the pressure $P_5$ will drop below pressure $P_o$ since restriction 84 will preclude instantaneous flow of $P_o$ into chamber 58. The actual pressure level of pressure $P_5$ will vary as a function of the rate of change of position of servopiston 54. Thus, the faster the rate of change of position of piston 54 the greater the pressure difference between $P_o$ and $P_5$, since a slow rate of change would allow $P_o$ to flow through restriction 84 into chamber 58 so as to preclude a pressure difference. The $P_5$ pressure drop developed in chamber 58 will be communicated via outlet 82, passage 128 and inlet 130 to bellows 126. The bellows 126 will retract tending to cause lever means 108 to further close valve 116 relative to orifice 120. This lead signal is functionally intended to dampen and smooth the responsiveness of the thrust control mechanism 86 to the increasing nozzle pressure $P_x$ as it is imposed upon the diaphragm 90, and thus lever means 108 to close valve 116 relative to orifice 120 in bringing the thrust control mechanism again to a null condition. As valve 116 approaches a null condition with respect to orifice 120, pressures $P_4$ and $P_3$ will increase. When pressure $P_3$ increases, it will cause the servopiston to approach a null condition relative to pressure $P_1$ acting on valve 48. Thus, when the thrust control mechanism 86 nulls, the fuel control 34 will correspondingly null.

It is understood that a request to the thrust control mechanism to decrease thrust will result in an identical converse action.

DESCRIPTION OF THE MODIFIED EMBODIMENTS

In the embodiments shown in FIGS. 2, 3 and 4, those parts which are identical to corresponding parts of the preferred embodiment, depicted in FIG. 1, will be given the same identifying numbers.

Figure 2:
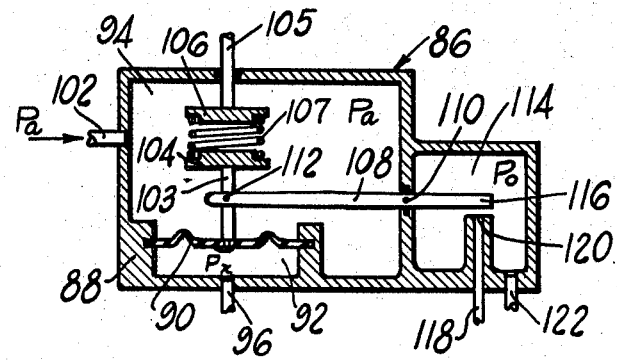
FIG. 2 is a modified sectional schematic of the components comprising the thrust control mechanism shown in FIG. 1 but excluding the resilient means for providing rate of change of fuel flow information.
Figure 3:
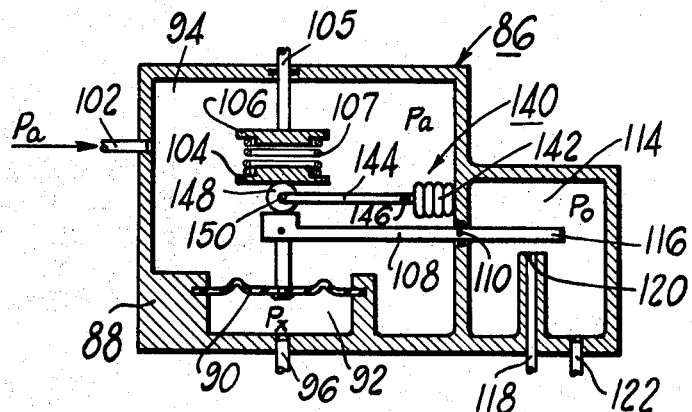
FIG. 3 is a modified sectional schematic of the components comprising the thrust control mechanism shown in FIG. 2 including an absolute reference means.
Figure 4:
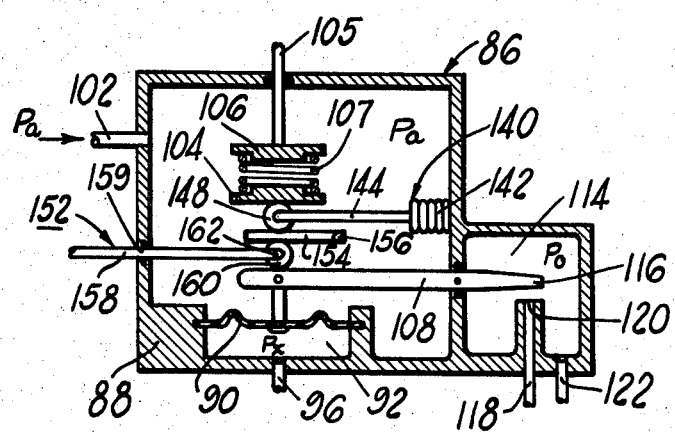
FIG. 4 is a modified sectional schematic of the components comprising the thrust control mechanism shown in FIG. 3 including a variable nozzle area input means.

The thrust control mechanism shown in FIGS. 2, 3 and 4, are intended to function in cooperation with the fuel control 34 shown in FIG. 1 for control of the gas turbine engine 10.

It is parenthetically mentioned that the thrust control mechanism 86 shown in FIG. 1 need not contain the bellows 126 to provide thrust control override of the fuel control 34. The bellows 126 enables thrust control refinement in that it provides an input to the thrust control mechanism to allow it to more smoothly achieve a null condition in response to a request for a change in thrust. Thus, FIG. 2 depicts a sectional schematic of the components comprising the thrust control mechanism shown in FIG. 1, but excluding the bellows 126 to depict a simplified form of the invention.

FIG. 3 is a modified sectional schematic of the components comprising the thrust control mechanism shown in FIG. 1 including n absolute reference means 140. The absolute reference means 140 is comprised of an evacuated bellows 142 being rigidly mounted to casing 88 on one end and free on its other end to vary as a function of ambient pressure changes, a shaft 144 pivotally attached by a pin 146 to the bellows 142, and a roller means 148 pivotally attached by a pin 150 to the shaft 144. The roller means 148 is operatively positioned intermediate the lever means 108 and the spring retainer 104 to transmit a request for thrust force from said spring retainer 104 to said lever means 108. The position of the roller means 148 is a function of bellows 142 expansion or contraction in response to a decreased or increased ambient pressure $P_a$. Thus, as the roller means 148 changes position, the lever arm of the thrust request force is changed to compensate for variations in ambient pressure $P_a$.

FIG. 4 is a modified sectional schematic of the components comprising the thrust control mechanism shown in FIG. 3 including a variable nozzle area input means 152. The variable nozzle area input means 152 is comprised of a lever 154 pivotally attached to casing 88 by a pin 156, a shaft 158 slidingly projecting outside the casing 88 through an opening 159, and a roller means 160 pivotally attached by a pin 162 to the shaft 158. The lever 154 operatively engages the roller means 160. The roller means 160 and the lever 154 are operatively positioned intermediate the lever means 108 and the roller means 148 to transmit a request for thrust force from said spring retainer 104 and roller means 148 to said lever means 108. The position of the roller means 160 is a function of the response of shaft 158 to a change in engine exhaust 16 nozzle area through a linkage (not shown) from the gas turbine engine 10 to the thrust control mechanism 86. Thus, as the roller means 160 changes position, the lever arm of the thrust request force is changed to compensate for changes in engine exhaust nozzle 16 area.

MODE OF OPERATION OF MODIFIED EMBODIMENTS

With reference to FIG. 3, the thrust control mechanism 86 is provided an absolute reference means 140 to compensate for ambient pressure $P_a$ changes experienced while operating the gas turbine engine 10 at varying altitudes. It is assumed that the gas turbine engine 10, the fuel control 34, and the thrust control mechanism 86 are mounted on an aircraft, not shown. As the aircraft climbs in altitude the ambient pressure $P_a$ decreases, and a greater value of $P_x-P_a$ is necessary to maintain the predetermined thrust request. Bellows 142 will expand and position the roller means 148 to the left to give the request for thrust force a larger lever arm with respect to lever means 108 thus requiring an increase in $P_x-P_a$ to null the system.

It is noted that an absolute reference means may or may not be a desirable compensation for the thrust control mechanism depending upon the responsiveness of the control to sensing errors resulting from altitude changes.

It is understood that a decrease in altitude causing an increase in ambient pressure $P_a$ will result in an identical converse action.

With reference to FIG. 4, the thrust control mechanism 86 is further provided a variable nozzle area input means 152 to compensate for changes in engine thrust as a function of the area of the exhaust nozzle of gas turbine engine 10. It is assumed that the gas turbine engine 10, the fuel control 34 and the thrust control mechanism 86 are mounted on an aircraft, (not shown) and that the engine is being operated under normal conditions. If the operator of the aircraft makes a change through a conventional nozzle area varying mechanism, (not shown), to reduce the area of engine exhaust nozzle 16, a change in $P_x-P_a$ must be requested to maintain the same predetermined thrust as set by shaft 105. As nozzle area reduces the linkage responsive to engine exhaust nozzle 16 area and operatively attached to shaft 158 will position the roller means 160 to the left to give the request for thrust force a larger lever arm with respect to lever means 108, thus $P_x-P_a$ must increase to exert a nulling force on the lever means 108 due to the decreasing change in nozzle 16 area.

It is understood that a change in controls to increase the area of engine exhaust nozzle 16 will result in an identical converse action.

While the specific details have been herein shown and described, the invention is not confined thereto, as other substitutions can be made within the spirit and scope of the invention.

I claim:

1. A thrust control mechanism for use with a combustion engine equipped with an exhaust nozzle, said control mechanism comprising:
   first valve means operatively connected to control fuel flow to said combustion engine;
   a means responsive to a request for increased or decreased thrust;
   said first valve means being responsive to said means responsive to a request for increased or decreased thrust to accordingly increase or decrease, respectively, the fuel flow to said combustion engine and thereby increase or decrease engine thrust;
   a pressure responsive member receiving exhaust nozzle pressure on one side and ambient pressure on its other side for sensing thrust as a function of the pressure drop across said exhaust nozzle;
   said first valve means being responsive to said pressure responsive member;
   said pressure responsive member being in a force opposing relationship with said means responsive to a request for thrust and responsive to a change in engine thrust to move said first valve means to null said thrust control mechanism;
   a resilient means defining a fluid filled variable volume chamber operatively connected to receive a fluid pressure variable as a function of the rate of change of fuel flow to said combustion engine; and
   said resilient means being operatively connected to said first valve means to oppose said request for increased or decreased thrust as a function of said rate of change of fuel flow.

2. A thrust control mechanism for use with a combustion engine as recited in claim 1 and further including:
   a source of pressurized fuel;
   a fuel conduit connected to deliver fuel from said source to said combustion engine;
   a variable area fuel control valve means operatively connected to said fuel conduit for controlling fuel flow therethrough;
   a bypass valve means across said fuel control valve means for maintaining a predetermined constant pressure drop thereacross;
   a fuel schedule means to vary the setting of said fuel control valve means through a servo means in response to predetermined variable inputs; and
   said first valve means operatively connected to said servo means to override the control of said fuel control valve means by said fuel schedule means.

3. A thrust control mechanism for use with a combustion engine as recited in claim 1 and further including:
   a source of pressurized fuel;
   a fuel conduit connected to deliver fuel from said source to said combustion engine;

a fuel control valve means operatively connected to said fuel conduit for controlling fuel flow therethrough;

a bypass valve means operatively connected to said fuel conduit for controlling the pressure drop across said fuel control valve means;

a fuel schedule means to vary the setting of said fuel control valve means in response to predetermined variable inputs; and said first valve means operatively connected to said fuel control valve means to override the control thereof.

4. A thrust control mechanism for use with a combustion engine as recited in claim 1 and further including:

a source of pressurized fuel;

a fuel conduit connected to deliver fuel from said source to said combustion engine;

a fuel control valve means operatively connected to said fuel conduit for controlling fuel flow therethrough;

a fuel schedule means to vary the setting of said fuel control valve means through a servo means in response to predetermined variable inputs; and said first valve means operatively connected to said servo means to override the control of said fuel control valve means by said fuel schedule means.

5. A thrust control mechanism for use with a combustion engine as recited in claim 1 and further including:

a source of pressurized fuel;

a fuel conduit connected to deliver fuel from said source to said combustion engine;

a fuel control valve means operatively connected to said fuel conduit for controlling fuel flow therethrough;

a fuel schedule means including cam means to vary the setting of said fuel control valve means in response to predetermined variable inputs;

said first valve means operatively connected to said fuel control valve means to override the control thereof.

6. A thrust control mechanism for use with a combustion engine as recited in claim 1 wherein said first valve means comprises:

a lever having a flapper valve on one end to control said flow of fuel to said combustion engine;

said lever being pivotally attached to rigid structure intermediate its ends;

said lever being pivotally responsive, near its other end, to said pressure responsive member;

said lever being further responsive, near its other end, to said means responsive to a request for increased or decreased thrust.

7. A thrust control for use with a combustion engine as recited in claim 1 wherein said means responsive to a request for increased or decreased thrust is a spring means of predetermined compressibility.